United States Patent
Tomeba et al.

(10) Patent No.: US 9,225,557 B2
(45) Date of Patent: Dec. 29, 2015

(54) RADIO COMMUNICATION SYSTEM AND RECEIVING APPARATUS

(75) Inventors: Hiromichi Tomeba, Osaka (JP); Osamu Nakamura, Osaka (JP); Shinpei Toh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 663 days.

(21) Appl. No.: 13/636,054

(22) PCT Filed: Mar. 29, 2011

(86) PCT No.: PCT/JP2011/057797
§ 371 (c)(1),
(2), (4) Date: Sep. 19, 2012

(87) PCT Pub. No.: WO2011/122618
PCT Pub. Date: Oct. 6, 2011

(65) Prior Publication Data
US 2013/0016712 A1    Jan. 17, 2013

(30) Foreign Application Priority Data
Mar. 30, 2010    (JP) .................. 2010-078467

(51) Int. Cl.
H04L 25/02    (2006.01)
H04L 27/26    (2006.01)

(52) U.S. Cl.
CPC ........ *H04L 25/0226* (2013.01); *H04L 25/0228* (2013.01); *H04L 27/2647* (2013.01)

(58) Field of Classification Search
None
See application file for complete search history.

(56) References Cited

U.S. PATENT DOCUMENTS

| 8,000,224 B2 | 8/2011 | Hamaguchi et al. |
| 8,711,814 B2 | 4/2014 | Iwai et al. |
| 2008/0318608 A1 | 12/2008 | Inoue et al. |

(Continued)

FOREIGN PATENT DOCUMENTS

| JP | 2002-344411 A | 11/2002 |
| JP | 2009-4926 A | 1/2009 |

(Continued)

OTHER PUBLICATIONS

3GPP TR 25.814, 3rd Generation Partnership Project; Technical Specification Group Radio Access network; "Physical layer aspects for evolved Universal Terestrial Radio access (UTRA)" v7.1.0, Sep. 2006.

(Continued)

*Primary Examiner* — Alex Skripnikov
(74) *Attorney, Agent, or Firm* — Birch, Stewart, Kolasch & Birch, LLP

(57) ABSTRACT

A radio communication system includes a multiple number of transmitting apparatus and a receiving apparatus including a multiple number of receive antennas, in which the transmitting apparatus generates a reference signal that is obtained by adding a different time shift to a known signal between the transmitting apparatus and the receiving apparatus, multiplexes a data signal with the reference signal and transmits the resultant signal. The receiving apparatus separates reference signals multiplexed on the signals received from the multiple transmitting apparatus, and estimates channel information from the reference signals, which have been transmitted through common frequencies in part or whole of the signal spectra. Then, the data signal is decoded based on the estimated channel information.

5 Claims, 12 Drawing Sheets

(56) References Cited

U.S. PATENT DOCUMENTS

| | | |
|---|---|---|
| 2009/0168730 A1* | 7/2009 | Baum et al. .................. 370/336 |
| 2009/0196166 A1 | 8/2009 | Hamaguchi et al. |
| 2010/0195637 A1 | 8/2010 | Iwai et al. |

FOREIGN PATENT DOCUMENTS

| | | |
|---|---|---|
| WO | WO 2007/142313 A1 | 12/2007 |
| WO | WO 2009/041066 A1 | 4/2009 |

OTHER PUBLICATIONS

3GPP, R1-092801, NTT DOCOMO "UL RS Enhancement for LTE-Advanced," Jun. 2009.

3GPP, R1-094911, NTT DOCOMO, "UL RS Enhancement fro LTE-Advanced", Nov. 2009.

* cited by examiner

FIG. 6
0-th User's Reference Signal
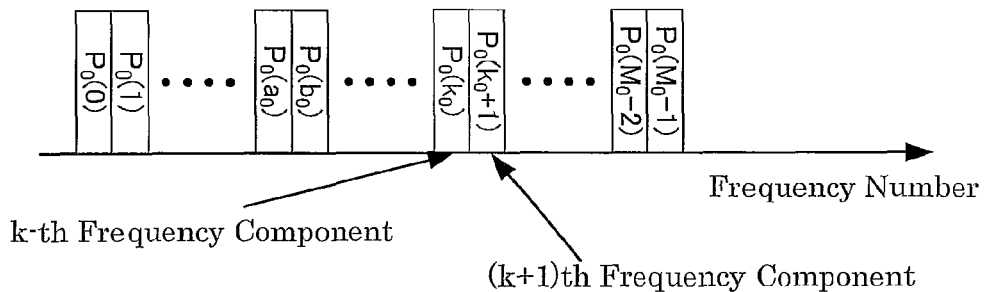
1st User's Reference Signal
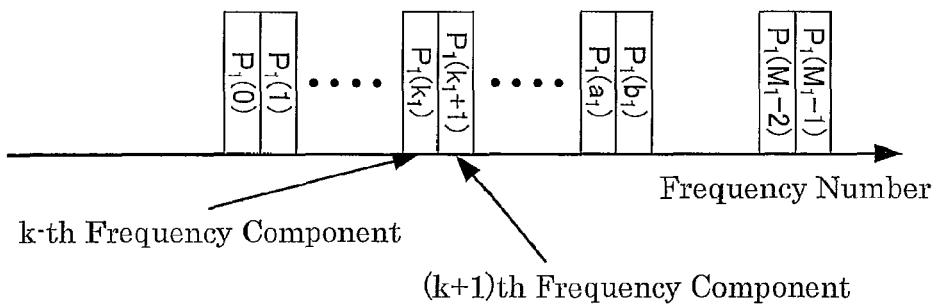
Received Signals observed at Receiving Apparatus
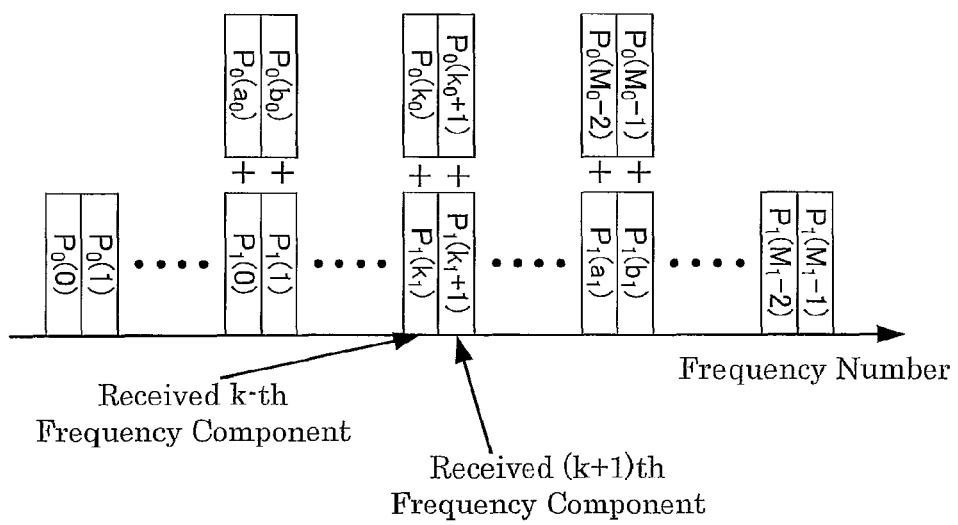

Continuous frequencies are allocated

| Signal Spectrum |

→ Frequency (a) State of SC-FDMA User's Signal Spectrum

Divided signal spectra are distributed

| Signal Spectrum |   | Signal Spectrum |   | Signal Spectrum |

→ Frequency (b) State of Clustered OFDM User's Signal Spectra

FIG. 12
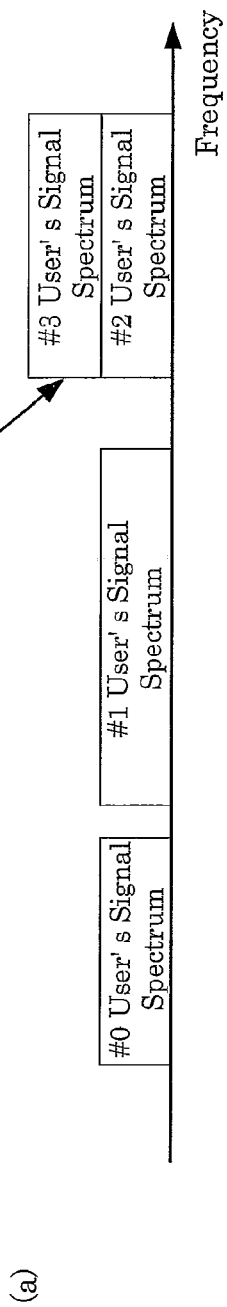
(a) Permit spatial multiplexing between users having spectra perfectly overlapped
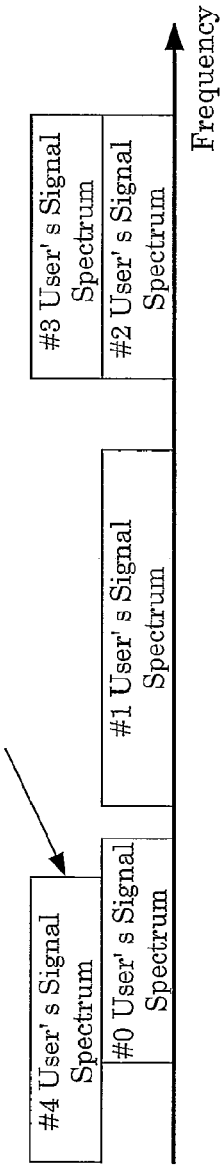
(b) Permit spatial multiplexing also between users having spectra partially overlapped

RADIO COMMUNICATION SYSTEM AND RECEIVING APPARATUS

TECHNICAL FIELD

The present invention relates to a radio communication system and the like including a plurality of transmitting apparatus and a receiving apparatus including a plurality of receive antennas.

BACKGROUND ART

In LTE (Long Term Evolution) having been standardized in 3GPP ($3^{rd}$ Generation Partnership Project) as the 3.9-generation radio transmission system, single carrier frequency division multiple access (SC-FDMA) is adopted for uplink (mobile station to base station) transmission.

In SC-FDMA, high frequency efficiency is achieved by flexible allocation of signal spectra depending on channel quality of individual users. Further, a plurality of users accessing at the same time form a virtual macro antenna array so as to spatially multiplex transmit signals from individual users, whereby MU-MIMO (Multi-User Multiple Input Multiple Output) that can be expected to improve frequency efficiency is supported on the uplink in LTE.

By the way, in the uplink transmission, in order to demodulate transmit signals from individual mobile stations, the base station needs to estimate channel information between each mobile station and the base station with high precision. It is possible to estimate channel information based on the reference signal previously determined between the base station and each mobile station. However, it is impossible to estimate channel information directly when spatial multiplexing by MU-MIMO is performed because the reference signals transmitted from individual users are spatially multiplexed and received.

However, in LTE, spatial multiplexing by MU-MIMO is permitted between the users that perform communications having the same signal bandwidth and the same frequency band (FIG. 12(a)), only. In this case, by using a cyclic shift (CS) technique, shown in non-patent document 1, which gives a cyclic shift unique to the user in the time domain to an identical reference signal sequence that has been given beforehand to the MU-MIMO participating users, each of MU-MIMO participating users could be made to maintain orthogonality of the reference signal with other users. However, since spatial multiplexing by MU-MIMO is permitted for only the users that perform communications having the same signal bandwidth through the same frequency band, there also occur limitations on the frequency scheduling that is determined depending on the channel conditions, so that there was a limit to improve frequency efficiency.

At present, as a predominant candidate of the 4th generation radio transmission system, LTE-A (LTE-Advanced) was proposed, and its standardization has been actively implemented. The uplink transmission in LTE-A is supposed to adopt a transmission scheme of a single carrier basis similarly to LTE. By the way, in the uplink MU-MIMO of LTE-A, in order to further improve frequency efficiency, as distinct from LTE, execution of spatial multiplexing in only part of signal spectra between LTE-A users has also been proposed (FIG. 12(b)).

In this case, a simple application of a CS technique cannot maintain orthogonality between reference signals, so that it is impossible to realize such an uplink MU-MIMO transmission system that permits part of signal spectra to be spatially multiplexed. It is therefore inevitable to establish a new channel estimation method.

There have been other discussions up to now about the methods of estimating channels based on reference signals that have been spatially multiplexed when LTE-A users perform spatially multiplexing in only part of signal spectra in the above way. Non-patent document 2 refers to a method of performing frequency division multiplexing (FDM) using a reference signal having a comb teeth-like signal spectrum, and use of the FDM technique enables channel estimation even when signal spectra of LTE-A users are spatially multiplexed in part.

For example, non-patent document 2 also refers to a method of code division multiplexing (CDM) by performing orthogonal coding of the reference signal in the time direction. In this method, even in the LTE-A system in which signal spectra are spatially multiplexed in part, allocation of multiple reference signals in the time direction enables estimation of channels of individual users that are spatially multiplexed.

PRIOR ART DOCUMENTS

Non-Patent Documents

Non-Patent Document 1: 3GPP TR25.814, "Physical layer aspects for evolved Universal Terrestrial Radio Access (UTRA)", v7.1.0, September 2006
Non-Patent Document 2: 3GPP, R1-092801, NTT DOCOMO "UL RS enhancement for LTE-Advanced," June 2009.

SUMMARY OF THE INVENTION

Problems to be Solved by the Invention

In order to further improve frequency efficiency, it is necessary to realize uplink MU-MIMO that permits partial superimposition between signal spectra of LTE users and LTE-A users. In order to realize such uplink MU-MIMO, it is necessary to accurately estimate channel information for demodulating transmitted data with low overhead.

However, in the method shown in non-patent document 1, the orthogonality between LTE-A users can be maintained but, the orthotnaliby between LTE and LTE-A users cannot be maintained, hence channel estimation cannot be performed.

Further, in the method shown in non-patent document 2, since it is necessary to distribute as many reference signals as the number of users to be multiplexed in the time direction, this not only leads to low frequency efficiency but also limits the number of users to be multiplexed when channel time selectivity is severe.

In this way, it was very difficult to estimate channels of individual users of which part of signal spectra are superimposed while maintaining backward compatibility with existing transmitters (LTE users), hence there has been no real uplink MU-MIMO transmission system in which signal spectra of LTE and LTE-A users are spatially multiplexed in part.

In view of the above problems, it is an object of the present invention to provide a radio communication system and the like using an uplink MU-MIMO transmission system that permits partial spatial multiplexing of signal spectra without adding a significant change to the transmitting apparatus of existing users.

Means for Solving the Problems

In view of the above problem, a radio communication system of the present invention resides in a radio communication system including a plurality of transmitting apparatus and a receiving apparatus including a plurality of receive antennas, and is characterized in that the transmitting apparatus includes:

a reference signal generator generating a reference signal that is obtained by adding a different time shift to a known signal between the transmitting apparatus and the receiving apparatus;

a reference signal multiplexer multiplexing data signal with the reference signal; and, a transmitter transmitting the signal multiplexed by the reference signal multiplexer, and the receiving apparatus includes:

a receiver receiving signals transmitted from the plural transmitting apparatus;

a reference signal separator separating reference signals multiplexed on the signals received by the receiver;

a channel estimator estimating channel information from the reference signals, partial or entire spectra of which have been transmitted through a common frequency; and, a decoder decoding the data signal, based on the channel information estimated by the channel estimator.

The radio communication system of the present invention is further characterized in that the receiving apparatus includes a channel estimator capable of estimating channel based on a plurality of different channel estimation methods for estimating the channel information, and the usage states of frequencies used by the plural transmitting apparatus to transmit respective signals are related with the multiple channel estimation methods.

The radio communication system of the present invention is further characterized in that the receiving apparatus further includes an estimation method switching unit that performs control of switching the channel estimation method of the channel estimator, in accordance with the usage state of frequencies used by the transmitters to transmit signals.

The radio communication system of the present invention is further characterized in that the estimation method switching unit varies the amount of time shift to be given to the known signal in the transmitting apparatus, in accordance with the selected channel estimation method.

The radio communication system of the present invention includes a first transmitting apparatus and a second transmitting apparatus, as transmitting apparatus, and, is characterized in that the estimation method switching unit performs control of switching estimation methods for estimating each of channel information for the first transmitting apparatus and the second transmitting apparatus, between when the frequencies the first transmitting apparatus is using and the frequencies the second transmitting apparatus is using are all in common and when the frequencies the first transmitting apparatus is using and the frequencies the second transmitting apparatus are only partly in common In the radio communication system of the present invention, the estimation method for estimating the channel information uses a CS scheme when the frequencies the first transmitting apparatus is using and the frequencies the second transmitting apparatus are only partly in common, and uses a spatial filtering scheme when the frequencies are only partly in common.

A receiving apparatus of the present invention is a receiving apparatus in a radio communication system including a plurality of transmitting apparatus and a receiving apparatus including a plurality of receive antennas, comprising:

a receiver receiving a signal that is formed by multiplexing a data signal with a reference signal that is obtained by adding a different time shift to a known signal between the transmitting apparatus and the receiving apparatus;

a reference signal separator separating the reference signal multiplexed on the signal received by the receiver;

a channel estimator estimating channel information from the reference signal;

and, a decoder decoding the data signal, based on the channel information estimated by the channel estimator.

Effect of the Invention

According to the present invention, the feasibility of uplink MU-MIMO in which signal spectra are spatially multiplexed in part is dramatically improved. Further, it is possible to contribute to sharp improvement of frequency efficiency without imposing any significant change on the transmitting apparatus of existing LTE users.

BRIEF DESCRIPTION OF THE DRAWINGS

FIG. 6 is a diagram showing states of signals in the first embodiment.

FIG. 12 is a diagram showing states of signals in the prior art.

MODE FOR CARRYING OUT THE INVENTION

The First Embodiment

To begin with, the first embodiment to which the present invention is applied will be described. In the first embodiment, SC-FDMA uplink transmission which U users simultaneously access will be discussed. When it is assumed that MU-MIMO permits, maximum, two users to be spatially multiplexed, the method of estimating channel information on two users that are spatially multiplexed in part will be shown. Here, in the present embodiment, in order to simplify description, it is assumed that the two users to be spatially multiplexed have the same transmission bandwidth. Hereinbelow, the users to be spatially multiplexed by MU-MIMO is referred to as MU-MIMO participating users. Further, the present invention can also be applied to an access scheme of a multi carrier basis, represented by the orthogonal frequency division multiple access (OFDMA).

Figure 1:
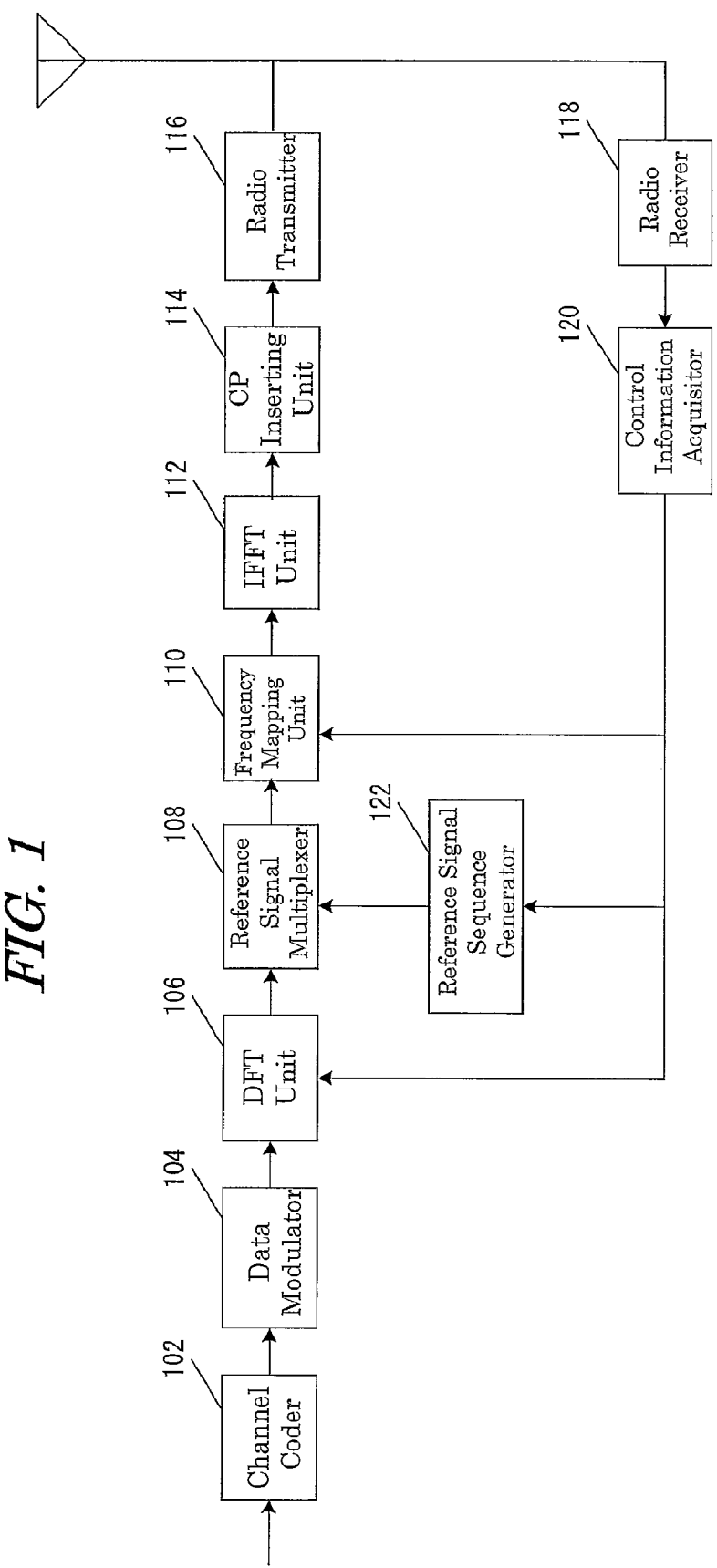
FIG. 1 is a diagram illustrating a functional configuration of a transmitting apparatus in the present embodiment (first embodiment).
Figure 2:
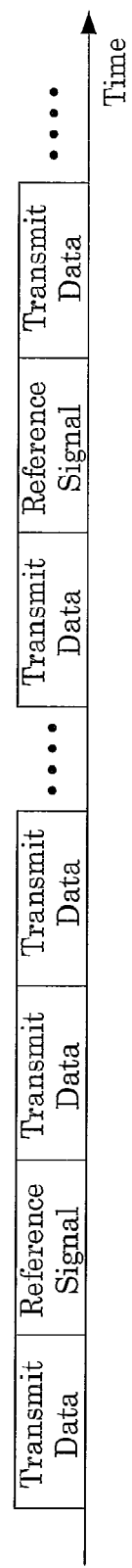
FIG. 2 is a diagram illustrating a frame configuration in the present embodiment (first embodiment).

FIG. 1 shows a functional configuration of a transmitting apparatus 1 in the present embodiment. Here, in the first embodiment, the number of transmit antennas of the transmitting apparatus of each user is assumed to be 1. Concerning the transmission frame configuration, it is assumed that the reference signal and the data signal are time-division multiplexed as shown in FIG. 2, forming transmission frames at a reference signal multiplexer 108. Here, it is assumed that every user has the same transmission frame configuration and that the reference signal and the transmission data are divided into time slots of a certain time length.

Transmission signal processing at transmitting apparatus 1 will be described. In the present embodiment, it is assumed for description simplicity that each user is allotted with a transmission band having $M_u$ sets of continuous frequencies. Here, u denotes the user number (u=0 to (U-1)).

Each user's transmit data sequence is channel coded at a channel coder 102, then is data modulated at a data modulator 104 into QPSK, 16QAM or the like. Thereafter, the resultant is subjected to discrete Fourier transform (DFT) at $M_u$ points so as to be transformed into $M_u$ frequency components.

Then, in reference signal multiplexer 108, the transmit data is multiplexed with a reference for channel estimation. Here, it is assumed that the frequency components of the reference signal are generated based on control information obtained from a control information acquisitor 120 and represented as $\{P_u(i); i=0 \text{ to } (M_u-1)\}$.

For the signal processing at the channel estimator in an aftermentioned receiving apparatus 2, the reference signal generated by a reference signal sequence generator 122 is generated as a reference signal sequence determined depending on the transmission bandwidth to which a phase rotation unique to each user is given. Here, the phase rotation to be given is determined depending on the channel estimation method used at the channel estimator in receiving apparatus 2.

The signals in the frequency domain are frequency-mapped by a frequency mapping unit 110 based on the control information from control information acquisitor 120. In frequency mapping unit 110, the frequencies other than the frequencies to which the reference signal has been mapped are inserted with 0. Then, the resultant is subjected to inverse fast Fourier transform (IFFT) in an IFFT unit 112, to generate a reference signal in the time domain.

Then, after cyclic prefixes (CP) are inserted at a CP inserting unit 114, the signal is transformed into a signal of an RF (Radio Frequency) band in a radio transmitter 116, and the resultant signal is transmitted from the transmit antenna. At this point, the transmit signals (including transmit data and reference signal) of MU-MIMO participating users are transmitted by assigning part or all of frequency components (frequency spectra) of the transmit signals to common frequencies in the same time slot.

Figure 3:
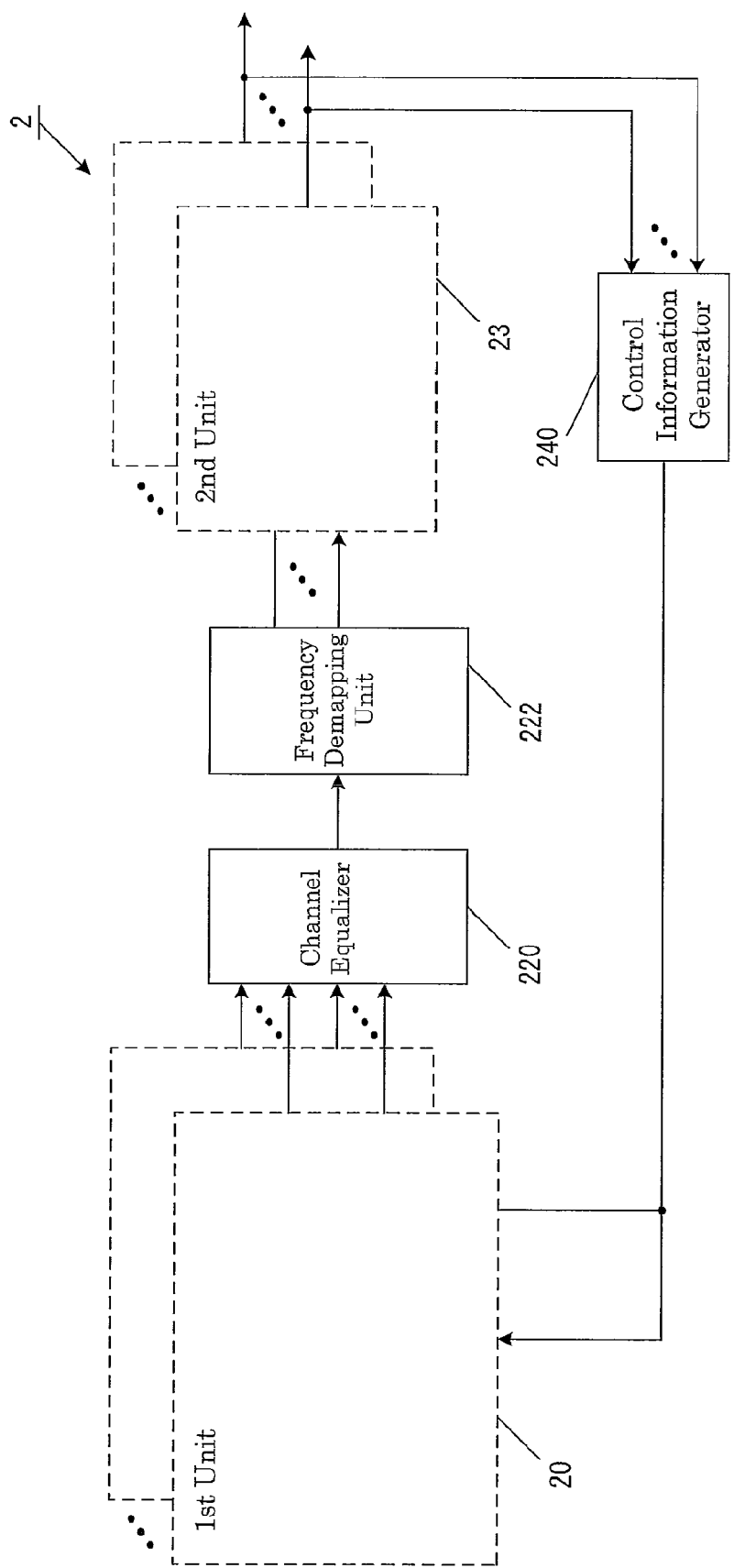
FIG. 3 is a diagram illustrating a functional configuration of a receiving apparatus in the present embodiment (first embodiment).
Figure 4:
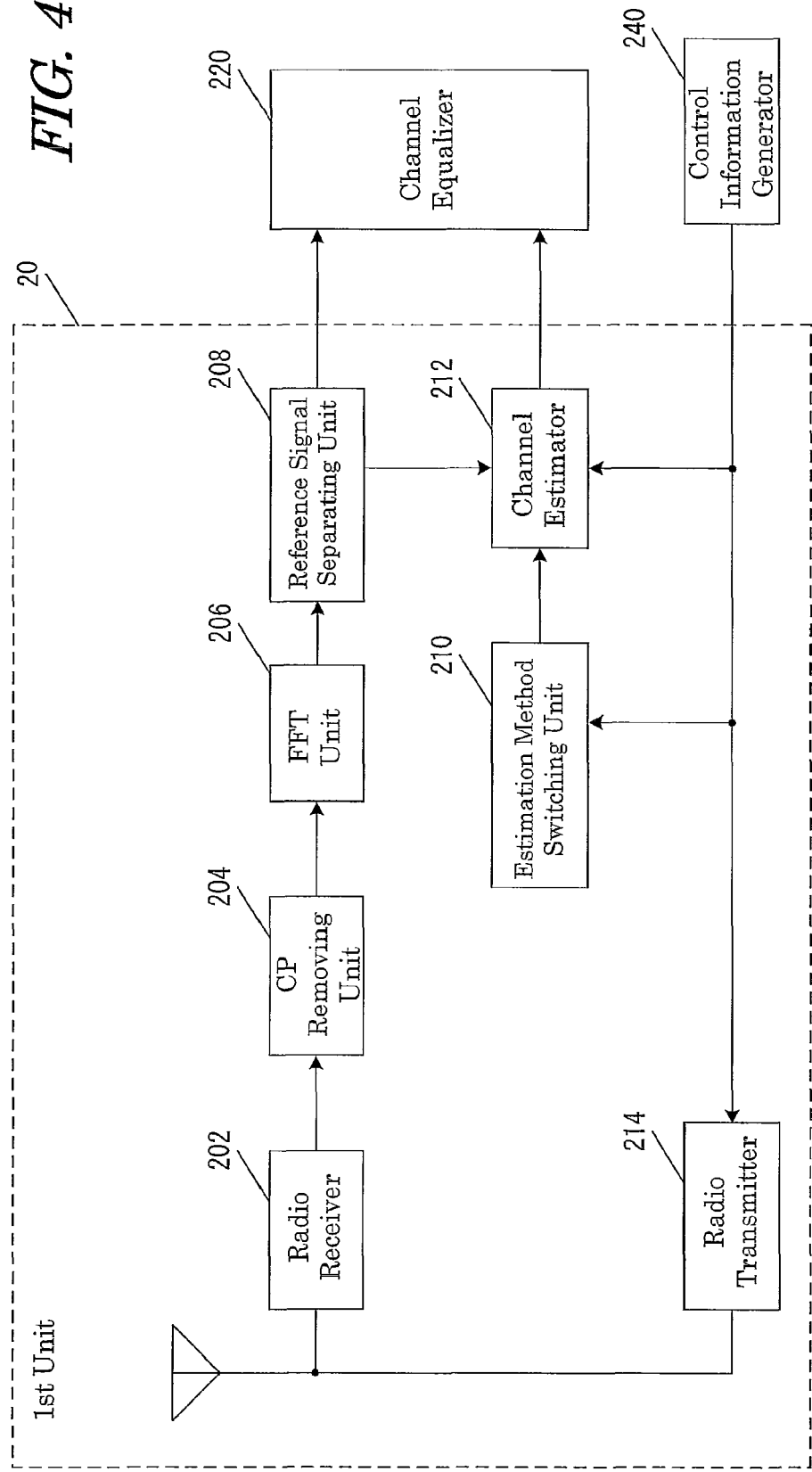
FIG. 4 is a diagram illustrating a functional configuration of a receiving apparatus in the present embodiment (first embodiment).
Figure 5:
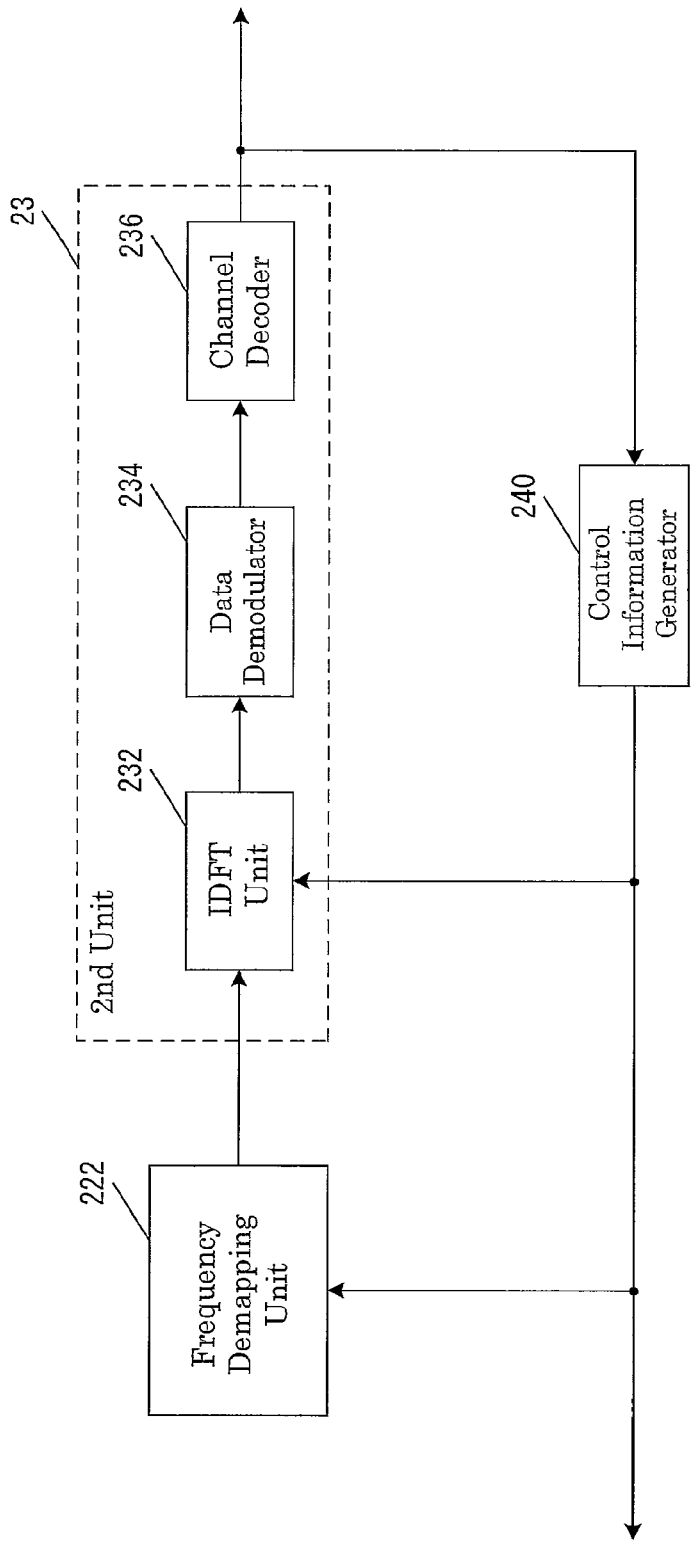
FIG. 5 is a diagram illustrating a functional configuration of a receiving apparatus in the present embodiment (first embodiment).

Next, FIGS. 3 to 5 show a functional configuration of a receiving apparatus 2 in the present embodiment. Here, the details of a first unit 20 depicted in FIG. 3 are shown in FIG. 4 while the details of a second unit 23 are shown in FIG. 5. Further, it is assumed that receiving apparatus 2 has $N_r$ antennas and, herein the m-th antenna (m=0 to ($N_r$-1)) should be observed. Moreover, a plurality of first units 20 and second units 23 of identical configurations are provided.

The receiving signal of the RF band received at the m-th receive antenna is converted into a baseband signal at radio receiver 202. Thereafter, after CPs are removed at a CP removing unit 204, the resultant signal is subjected to fast Fourier transform (FTT) at an FFT unit 206 to be transformed into a signal in the frequency domain. Then, the received signal transformed in the frequency domain is input to reference signal separating unit 208 and separated into the transmission data and the reference signal, which are subjected to different signal processes.

First, signal processing on transmit data will be explained. The transmit data separated at reference signal separating unit 208 is input to a channel equalizer 220 and subjected to a channel equalization process typified by frequency domain equalization using the channel estimated values obtained from an aftermentioned channel estimator 212.

When transmit data spatially multiplexed by MU-MIMO is input to channel equalizer 220, in channel equalizer 220 a signal separating process is also implemented. The transmit data having undergone equalization processing is input to a frequency demapping unit 222, where the data is subjected to frequency demapping based on the control signal obtained from a control information generator 240 so that the received signal of each user after equalization is obtained. Thereafter, the signal is transformed into a time domain signal by inverse discrete Furrier transform (IDFT) at an IDFT unit 232, then input to a data demodulator 234 and a channel decoder 236 so that the transmit data of each user is demodulated.

Next, the received signal process on the reference signal will be described. The reference signal is input to channel estimator 212 in order to estimate channel information needed upon data demodulation. In this case, since the reference signals of the MU-MIMO participating users are frequency-mapped and transmitted using common frequencies for part or all of frequency components, the reference signals are received by spatial multiplexing in two kinds of patterns, i.e., the case in which the frequency components of one reference signal is partly multiplexed with the frequency component of the other and the case in which all the frequency components of the two reference signals are multiplexed. In order to estimate channel information on each user with high precision based on the reference signals different in the way of spatial multiplexing, in the present embodiment, channel estimation is performed by switching between the CS scheme and the spatial filtering scheme described below depending on the state of frequency mapping while generation of reference signals is also performed adaptively so as to be suitable for the channel estimation method.

Now, channel estimator 212 has a plurality of channel estimation methods capable of channel estimation, such as the CS scheme and spatial filtering scheme described below. The channel estimation methods are associated with the usage states of frequencies (frequency mapping) which a plurality of transmitting apparatus use to transmit individual signals, and the most suitable channel estimation method is selected in accordance with frequency mapping. Selection of a channel estimation method at channel estimator 212 is controlled by an estimation method switching unit 210 in accordance with frequency mapping.

In the present embodiment, in accordance with the frequency mapping being applied to MU-MIMO participating users, the most suitable channel estimation method is selected by estimation method switching unit 210 of receiving apparatus 2 while the phase rotation given in reference signal sequence generator 122 of transmitting apparatus 1 is also adaptively controlled based on the channel estimation method determined by estimation method switching unit 210, whereby precision of channel estimation is improved.

When all the frequency components are multiplexed, control information to direct use of the CS scheme is transmitted from estimation method switching unit 210 of receiving apparatus 2 to channel estimator 212. When the CS scheme is applied, control information is sent from control information generator 240 of receiving apparatus 2 to reference signal sequence generator 122 of transmitting apparatus 1 so that the phase rotation given by reference signal sequence generator 122 of each user transmitting apparatus 1 is set at the optimal value for the CS scheme. The optimal phase rotation for the CS scheme is determined depending on the delay time of the path through which the receiving apparatus receives signals with the largest delay, among the multi-paths that form the channel.

On the other hand, when part of the frequency components of the reference signals is multiplexed, the CS scheme cannot be used for channel estimation. To deal with this, among the received frequency components on which reference signals are multiplexed, the k-th and (k+1)-th frequency components should be observed. The k-th and (k+1)-th frequency components of the received signal at the m-th receive antenna, $\{R_m(k), R_m(k+1)\}$, are given as follows: —

[Math 1]

$$R_m(k) = H_{m,0}(k)P_0(k_0) + H_{m,1}(k)P_1(k_1) + N_m(k)$$

$$R_m(k+1) = H_{m,0}(k+1)P_0(k_0+1) + H_{m,1}(k+1)P_1(k_1+1) + N_m(k+1) \quad (1)$$

Here, $H_{m,u}(k)$ represents the complex channel gain between the u-th user and the m-th receive antenna of the base station, $N_m(k)$ represents the noise added to the m-th receive antenna.

Further, $\{k_u; u=0,1\}$ represents the frequency index of the u-th user's reference signal superimposed with the k-th frequency (FIG. 6). Here, if the channel frequency-selectivity is not so strong, it is possible to apply approximation: $H_{m,u}(k) \approx H_{m,u}(k+1)$. In this case, the expression 1 can be represented as the follows, using matrixes.

[Math 2]

$$R = PH + N \quad (2)$$

Here,

[Math 3]

$$\begin{cases} R = \begin{pmatrix} R_m(k) \\ R_m(k+1) \end{pmatrix} \\ P = \begin{pmatrix} P_0(k_0) & P_1(k_1) \\ P_0(k_0+1) & P_1(k_1+1) \end{pmatrix} \\ H = \begin{pmatrix} H_{m,0}(k) \\ H_{m,1}(k) \end{pmatrix} \\ N = \begin{pmatrix} N_m(k) \\ N_m(k+1) \end{pmatrix} \end{cases} \quad (3)$$

Herein, though H is the quantities wanted to be estimated, P and H are regarded as the channel matrix and H the transmit signal, an expression 2 can be understood to be equivalent to the received signal of MIMO-Space Division multiplexing (MIMO-SDM) using two transmit antennas and two receive antennas. By multiplying $P^{-1}$, the inverse matrix of P, the estimated matrix $\hat{H}$ corresponding to channel H can be obtained.

[Math 4]

$$\hat{H} = P^{-1}R = H + P^{-1}N \quad (4)$$

Here, the estimation method by multiplying this inverse matrix shall be termed an implementation of channel estimation by multiplying a spatial filter matrix $W_{ZF}$ ($=P^{-1}$) on a Zero-forcing (ZF) basis. However, in the present embodiment, since reference signal sequence generator 122 of transmitting apparatus 1 generates, for each user, a reference signal sequence by giving a phase rotation unique to the user to an identical reference signal sequence, there occurs cases where the inverse matrix of $P^{-1}$ becomes extremely small so that the precision of channel estimation is greatly degraded due to noise emphasis.

In the present embodiment, a spatial filter matrix $W_{MMSE}$ that minimizes the mean square error (MSE) between the actual channel H and the channel estimate $\hat{H}$ is multiplied to perform channel estimation. $W_{MMSE}$ is given as following expression: —

[Math 5]

$$W_{MMSE} = (P^H P + (1/\gamma)I_2)^{-1}P^H \quad (5)$$

This shall be termed an implementation of channel estimation by multiplying a spatial filter matrix on a minimum MSE (MMSE) basis. Here, $\gamma$ represents the power ratio between the transmission power of the reference signal and the received noise power and $I_m$ represents the m×m unit matrix.

In the spatial filtering scheme, when the determinant of the spatial filter matrix is extremely small, even if a filter matrix on an MMSE basis is used, the precision of channel estimation will sharply lower. To deal with this, in the present embodiment, in order to prevent the precision of channel estimation from lowering, control information generator 240 of receiving apparatus 2 notifies each transmitting apparatus 1 of a phase rotation that will not make the determinant of the spatial filter matrix small so that reference signal sequence generator 122 of each transmitting apparatus 1 determines a phase rotation based on the notified control information.

As to the phase rotation which reference signal sequence generator 122 of transmitting apparatus 1 gives to the reference signal sequence, the phase rotation suited to the CS scheme is set up when estimation method switching unit 210 of receiving apparatus 2 switches the channel estimation method to the CS scheme. On the other hand, when estimation method switching unit 210 switches the channel estimation method to the spatial filtering scheme, the phase rotation suited to the spatial filtering scheme is adaptively set up. It is also possible to fix the phase rotation at the optimal value for either of the two, in order to reduce the amount of control information to be used for notification.

When the phase rotation which reference signal sequence generator 122 of transmitting apparatus 1 provides is fixed at the value suited for the CS scheme while estimation method switching unit 210 of receiving apparatus 2 has selected the spatial filtering scheme, there is a possibility that the value of the determinant of the spatial filter matrix used in the spatial filtering scheme becomes extremely small.

In this case, in the spatial filtering scheme, two frequency components that are not limited to adjacent frequency components but are separated to each other in a range in which change of the channel in the frequency domain is negligible (within the coherence bandwidth) can be used, so that it is possible to apply the spatial filtering scheme using two frequency components which will not lower the determinant of the spatial filter. It is also possible to apply the spatial filtering scheme using three or greater number of frequency components.

When the phase rotation which reference signal sequence generator 122 of transmitting apparatus 1 provides is fixed at the value suited for the spatial filtering scheme while estimation method switching unit 210 of receiving apparatus 2 has selected the CS scheme, there is a possibility that the phase rotation does not meet the requirements for the CS scheme so that the reference signal of one user will not be orthogonal to that of another. In this case, even if all the frequency components are spatially multiplexed, channel estimation may be performed using the spatial filtering scheme.

Here, in the present embodiment, the number of users to be spatially multiplexed is two, but it is possible to perform multiplexing of users up to the maximum spatial multiplexing number $U_{max}$ of the MU-MIMO that is determined by the number of antennas of receiving apparatus 2.

Further, in the present embodiment, it is possible to realize uplink MU-MIMO that permits partial superimposing of signal spectra while keeping the configuration of transmitting apparatus 1 approximately the same as that based on the conventional SC-FDMA scheme. Since the different point is that the phase rotation given by reference signal sequence generator 122 of transmitting apparatus 1 is optimized in accordance with the channel estimation method of receiving apparatus 2 that is adaptively changed by estimation method switching unit 210 of receiving apparatus 2, it is possible to apply this to a LTE system, and preform uplink MU-MIMO in which signal spectra are partially superimposed.

Further, from the present embodiment it becomes possible to perform MU-MIMO transmission in which users having signal spectra partially overlapped are spatially multiplexed. Accordingly, it is possible to use the assignable frequencies with less waste compared to the conventional MU-MIMO transmission. Further, even if the number of spatial multiplexing is greater than 2, it is possible to estimate channel information of each user while the reference signal to be time-multiplexed does not increase in proportion to the number of spatial multiplexing like the CDM scheme. Since in MU-MIMO the frequency efficiency improves in proportion to the number of spatial multiplexing, the present embodiment can contribute to drastic enhancement of the transmission speed of the whole system.

The Second Embodiment

Next, the second embodiment will be described. In the first embodiment, SC-FDMA uplink transmission adopted in LTE was discussed. In SC-FDMA, the transmit signal spectrum is allotted to continuous frequencies. In order to positively make use of channel frequency selectivity, Clustered DFT-Spread Orthogonal Frequency Division Multiplexing (Clustered DFT-Spread OFDM) in which a signal spectrum is divided into separate frequencies and allotted, has been adopted as one of LTE-A uplink transmission schemes. Under this circumstance, the second embodiment is aimed at a case where Clustered DFT-Spread OFDM transmission users are spatially multiplexed by MU-MIMO. Hereinafter, Clustered DFT-Spread OFDM is called Clustered OFDM.

Similarly to the first embodiment, the second embodiment will be considered taking a case where two users (which will be called the 0-th user and 1st user) having one transmit antenna and the same transmission bandwidth assigned are spatially multiplexed by MU-MIMO. However, similarly to the first embodiment, three or more users may be spatially multiplexed.

The transmitting apparatus 1 of the second embodiment has basically the same configuration (FIG. 1) as the transmitting apparatus 1 of the first embodiment. The difference resides in the signal processing in frequency mapping unit 110 of the transmitting apparatus.

Figure 7:
FIG. 7 is a diagram showing states of signals in the second embodiment.

In SC-FDMA discussed in the first embodiment, the transmit data is mapped to continuous frequencies (FIG. 7(*a*)), whereas in Clustered OFDM as the target of the second embodiment, the signal spectrum is divided into a plurality of frequency blocks, and individual frequency blocks are dispersedly distributed (FIG. 7(*b*)). The transmit signal processing in transmitting apparatus 1 other than frequency mapping is the same as the first embodiment, so that description is omitted.

Figure 8:
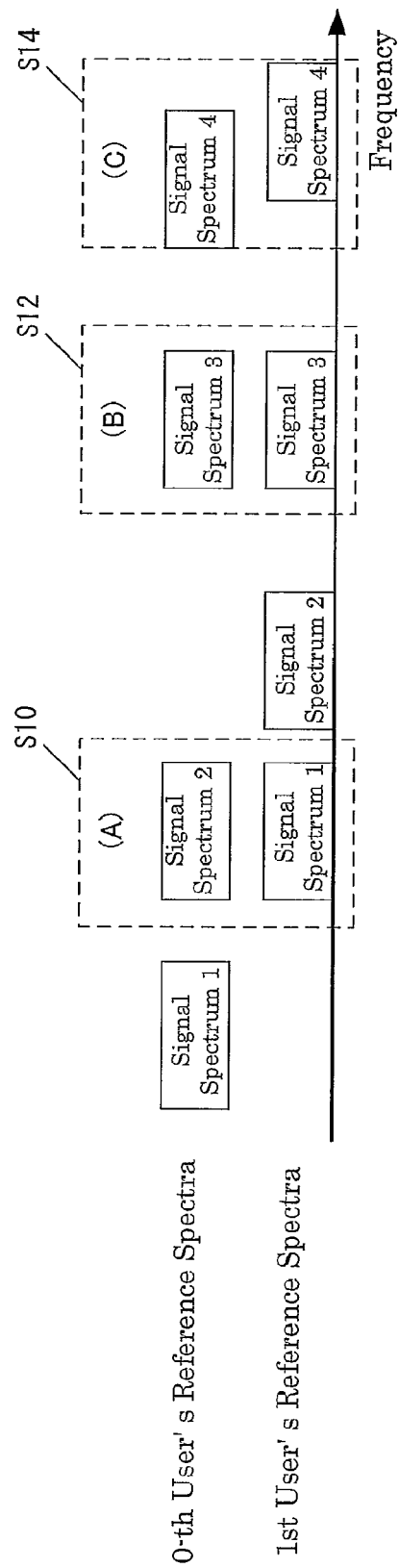
FIG. 8 is a diagram showing states of signals in the second embodiment.

The configuration of receiving apparatus 2 for Clustered OFDM is also the same as SC-FDMA (FIG. 3). When Clustered OFDM transmission users are spatially multiplexed by MU-MIMO, the received signal spectra are superimposed as shown in FIG. 8. Since the reference signal sequence of each user is an identical reference signal sequence to which a phase rotation unique to the user has been given in reference signal sequence generator 122 of transmitting apparatus 1, there are three possible cases, the first case where different portions of the reference signal sequences are spatially multiplexed (S10 in FIG. 8), the second case where the same portions of the reference signal sequences that are given with different phase rotations are spatially multiplexed (S12 in FIG. 8), and the third case where divided frequency blocks are spatially multiplexed in part (S14 in FIG. 8). In the second embodiment, estimation method switching unit 210 of receiving apparatus 2 adaptively switch the channel estimation method between two schemes, i.e., the CS scheme and the spatial filtering scheme, depending on how the frequency blocks are spatially multiplexed.

When frequency blocks of the same sequence but having different phase rotations are spatially multiplexed, estimation method switching unit 210 of receiving apparatus 2 sends control information to channel estimator 212 so as to use the CS scheme. When different portions of the reference signal sequences are spatially multiplexed, and when divided frequency blocks are spatially multiplexed in part, estimation method switching unit 210 of receiving apparatus 2 sends control information to channel estimator 212 so as to use the spatial filtering scheme.

As described in the first embodiment, the optimal value of the phase rotation given in transmitting apparatus 1 depends on the channel estimation method applied to channel estimator 212 of receiving apparatus 2. Since the incidence of use of each channel estimating scheme applied to channel estimator 212 of receiving apparatus 2 depends on frequency mapping, a phase rotation suited to the CS scheme may be given when the CS scheme is applied with high incidence, whereas a phase rotation sited to the spatial filtering scheme may be given when the spatial filtering scheme is applied with high incidence.

Further, as shown in the first embodiment, the phase rotation may be fixed at a value that optimizes one of the two channel estimation methods. In this case, the transmitting apparatus may be provided to generate transmit signals so as to improve channel estimation accuracy by applying frequency mapping such that the channel estimation method for which the phase rotation is optimized is used with higher incidence. For example, when the phase rotation is optimized for the CS scheme, it is possible for the frequency mapping unit to improve channel estimation accuracy by performing frequency mapping so that spatial multiplexing portions such as S10 in FIG. 8 are formed more frequently.

Though the discussion heretofore is focused on the Clustered OFDM that forms frequency blocks by dividing one reference signal sequence, there is a possible scheme of Clustered OFDM transmission in which a short reference signal sequence that is adjusted to the bandwidth of the divided frequency blocks is generated in the reference signal sequence generator so as to allot the short reference signal sequence to each frequency block. In this case, estimation method switching unit 210 of receiving apparatus 2 may set up either the CS scheme or the spatial filtering scheme. Further, transmitting apparatus 1 may either optimize the phase rotation or fix the phase rotation at a constant value, in accordance with the incidence with which channel estimator 212 uses each channel estimation method.

The second embodiment was focused on Clustered OFDM. Since Clustered OFDM is an uplink transmission scheme adopted in LTE-A, the present embodiment makes it possible to realize uplink MU-MIMO that permits part of the signal spectrum of each user to be spatially multiplexed in LTE-A, hence contributes to further improvement of frequency efficiency. Further, since, in Clustered OFDM, the state in which the divided frequency blocks are assigned to continuous frequency components corresponds to the SC-FDMA transmission scheme adopted in LTE, it is possible to realize uplink MU-MIMO that can spatially multiplex part of signal spectra of LET-A users and LTE users. In this case, since no significant modification will not be needed for the LTE user transmitting apparatus, it is possible to maintain backward compatibility, which is demanded in LTE-A.

The Third Embodiment

The second embodiment was focused on Clustered OFDM, which is an access scheme of a single carrier basis adopted in LTE-A uplink transmission. It was also shown that spatial multiplexing with LTE users adopting SC-FDMA as the uplink access scheme is made possible. On the other hand, it is also possible to contemplate a spectrum division access scheme (FIG. 9) in which, instead of dividing a SC-FDMA signal spectrum into multiple blocks as in Cluster OFDM, each frequency component is assigned to an arbitrary frequency, this leading to further improvement in frequency scheduling effect. The third embodiment is configured aiming at the case where two users are spatially multiplexed by MU-MIMO, in the uplink transmission using the spectrum division access scheme.

Figure 9:
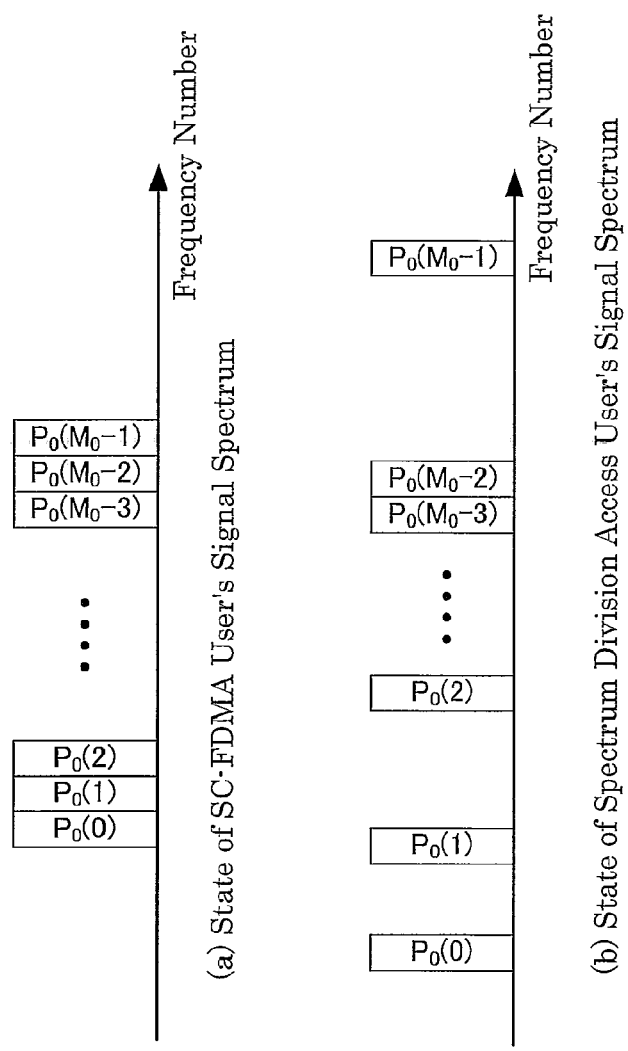
FIG. 9 is a diagram showing states of signals in the third embodiment.

The transmitting apparatus configuration for spectrum division access is essentially the same as that of SC-FDMA (FIG. 3). The difference between SC-FDMA and spectrum division access resides in a frequency mapping unit 110 of the transmitting apparatus. In SC-FDMA, the transmit data is mapped to continuous frequencies, whereas in spectrum division access, individual frequency components of the SC-FDMA signal spectrum are separately mapped (FIG. 9). Further, frequency mapping also depends on the channel estimation method in channel estimator 212 of the aftermentioned receiving apparatus. The transmit signal process in the transmitting apparatus other than frequency mapping is the same as in the first embodiment, so that description is omitted.

The receiving apparatus configuration for spectrum division access is also the same as that of SC-FDMA (FIG. 3). The estimation method of channel in frequencies on which the signal spectra of users of spectrum division access transmission have been superimposed will be described.

Figure 10:
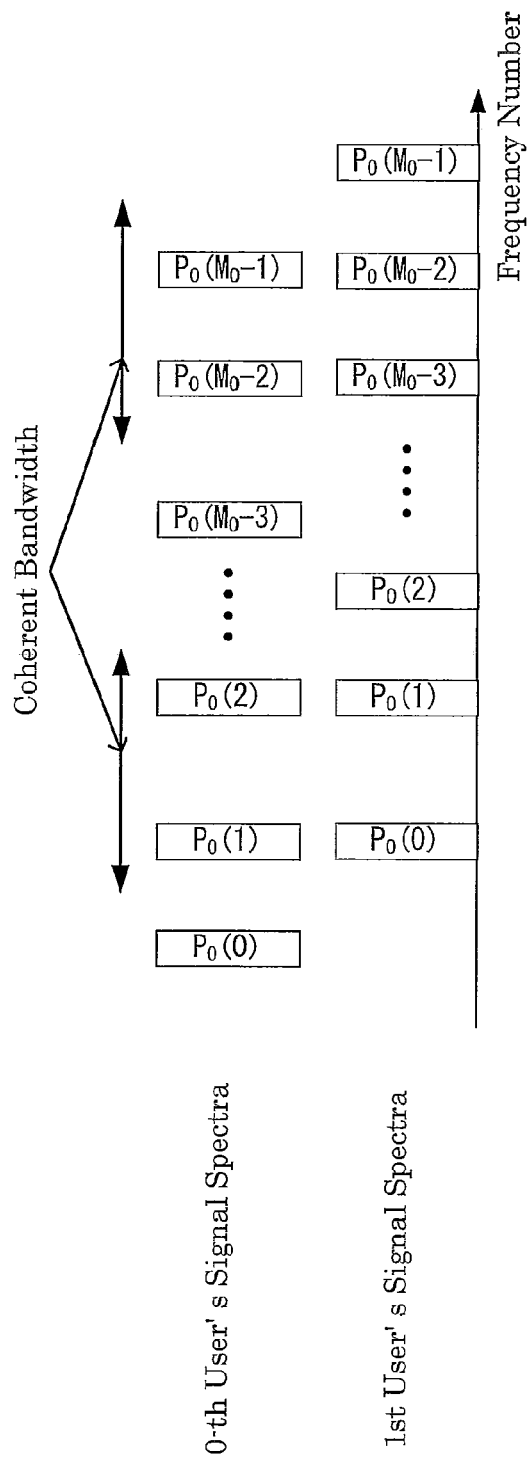
FIG. 10 is a diagram showing states of signals in the third embodiment.

Since the signal spectra to be superimposed are discrete, it is impossible to apply the CS scheme. Accordingly, the spatial filtering scheme is used in channel estimator 212 of the receiving apparatus. In the spatial filtering scheme, it is impossible to estimate channel information if there are a plurality of frequency components to which the reference signals are spatially multiplexed, within the coherence bandwidth. Therefore, in control information generator 240 of the receiving apparatus, control information is generated so that frequency mapping is implemented so as to spatially multiplex two or more frequency components of the transmit signals of MU-MIMO participating users, within the coherence bandwidth, whereas in transmitting apparatus, the frequency mapping is implemented based on the control information (FIG. 10).

The precision of channel estimation in the spatial filtering scheme depends on the determinant of the spatial filter matrix used for channel estimation. In order to improve the precision of channel estimation, the phase rotation given to the reference signal sequence at reference signal sequence generator 122 of the transmitting apparatus is controlled so that the determinant of the spatial filter matrix does not become small, similarly to the first embodiment. Further, in the frequency mapping unit of the transmitting apparatus, the frequency components of the reference signal may be cyclically shifted in the frequency direction so that the determinant of the spatial filter matrix does not become small.

Since it is possible by MU-MIMO to spatially multiplex part of signal spectra of users using the spectrum division access scheme, thanks to the present embodiment, it is possible to implement more flexible frequency scheduling, hence leading to further improvement in frequency efficiency.

The Fourth Embodiment

Figure 11:
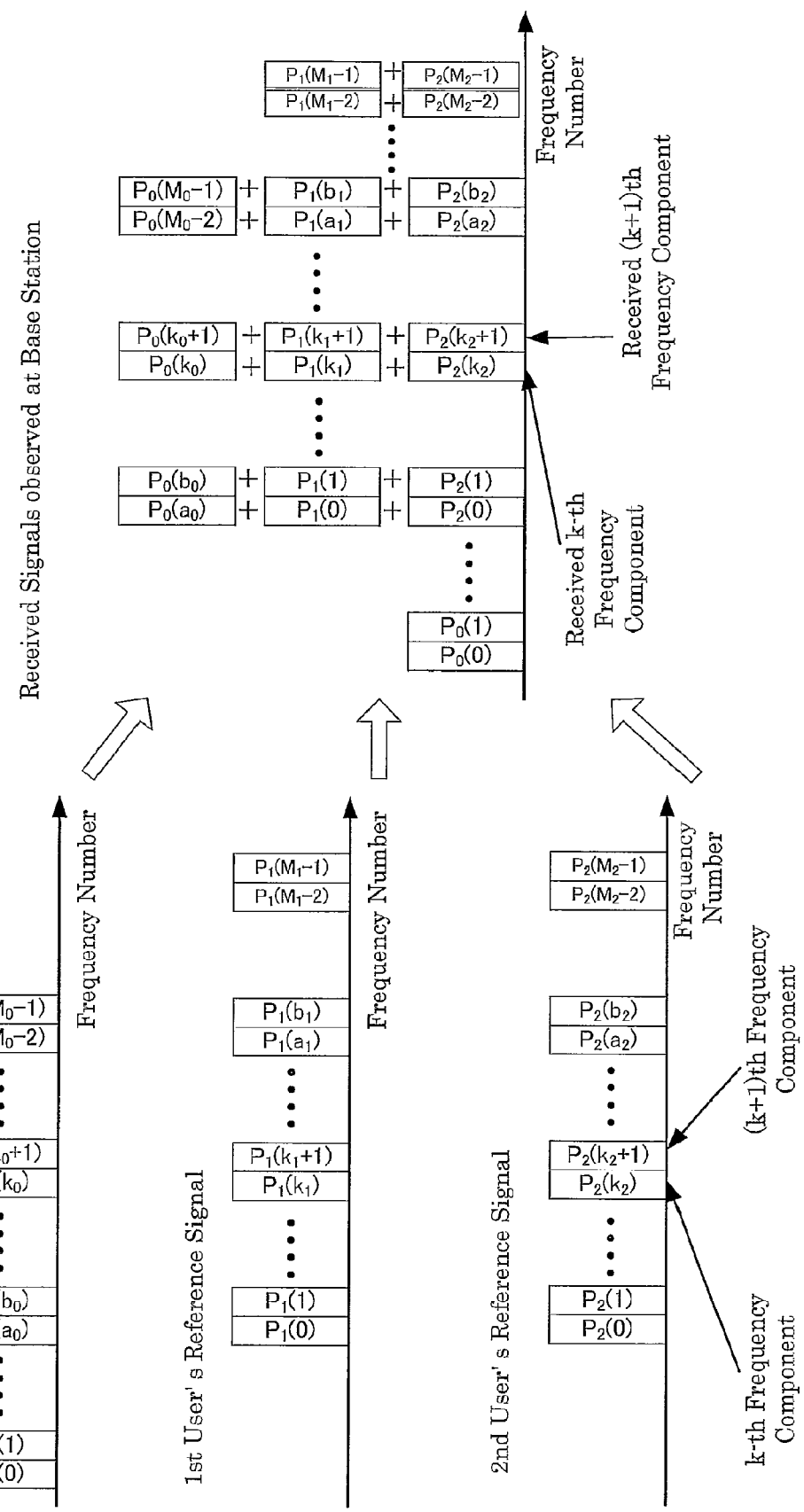
FIG. 11 is a diagram showing states of signals in the fourth embodiment.

Next, the fourth embodiment will be described. Here, there has been proposed in LTE-A an MU-MIMO technique in which the signal spectra of users of a system such as LTE that already has an established channel estimation method and the signal spectra of users of a different system are partly superimposed. In this case, as shown in FIG. 11, there can be considered a case where two users having the same transmission bandwidth are spatially multiplexed in MU-MIMO while part of the signal spectra of an additional user is further spatially multiplexed.

For the two users of the same transmission bandwidth, it is possible to maintain orthogonality of the reference signals by the CS scheme. However, for the user whose signal spectra are spatially multiplexed in part, the spatial filtering scheme is used so that channel estimator 212 of the receiving apparatus will use both the CS scheme and the spatial scheme at the same time, instead of switching between them.

In the fourth embodiment, a case where existing users using the CS scheme and a user using the channel estimation method of the present embodiment are spatially multiplexed by MU-MIMO will be discussed as the target of SC-FDMA uplink transmission.

It is assumed that the existing users using the CS scheme are the 1st and 2nd users while the user using the scheme of the present embodiment is the 0-th user, each having one transmit antenna. It is assumed that the first user and the second user have the same transmission bandwidth and use the same frequency.

The transmitting apparatus configuration of each user is essentially the same as that of the first embodiment, so that detailed description is omitted. The difference is the reference signal sequence generated at reference signal sequence generator 122. In reference signal sequence generator 122 of the 2nd user's transmitting apparatus, phase rotation is given to the same reference signal sequence $\{P_1(i); i=0 \text{ to } (M_1-1)\}$ as that of the 1st user, so as to maintain orthogonality to the first user when the CS scheme is applied in channel estimator 212 of the receiving apparatus. The phase rotation given to the second user is denoted as τ, the reference signal sequence is given as the following expression.

[Math 6]

$$P_2(i) = P_1(i)\exp\left(-j2\pi i \frac{\tau}{M_1}\right) \quad (6)$$

On the other hand, in the 0-th user's reference signal sequence generator 122, similarly to the first embodiment, an appropriate phase rotation is given to the reference signal sequence in accordance with the channel estimation method applied to channel estimator 212 of the receiving apparatus.

The receiving apparatus configuration is also approximately the same as the first embodiment. Since the difference resides in the signal processing in the channel estimator, only the channel estimation method will be described. Herein, it is assumed for simplicity that part of the frequency components of the 0-th user's reference signal is spatially multiplexed over the first and second user's reference signals, as shown in FIG. 11. Since part of the reference signal is spatially multiplexed, the spatial filtering scheme will be applied in order to estimate the channel information on the 0-th user.

It should be noted that if all the frequency components of the 0-th user are also spatially multiplexed, it is possible to estimate channel by applying the CS scheme to the 0-th user similarly to the first embodiment. The received signal in the k-th frequency at the m-th receive antenna is given by the following expression.

[Math 7]

$$R_m(k) = \quad (7)$$
$$H_{m,0}(k)P_0(k_0) + H_{m,1}(k)P_1(k_1) + H_{m,2}(k)P_1(k_1)\exp\left(-j2\pi k_1 \frac{\tau}{M_1}\right)$$

The phase rotation τ, given to the second user's reference signal sequence is determined based on the channel delay spread. The signal processing at channel estimator 212 in the present embodiment becomes different depending on this phase rotation τ.

When the phase rotation τ is rather small, it is possible to assume that the phase difference given to the adjacent frequency components of the reference signal is so small as to be negligible. In this case, it is possible to implement channel estimation by using two adjacent frequency components, and the received signal can be represented as the expression 2. In this case, R, P, H and N are given as follows.

[Math 8]

$$\begin{cases} R = \begin{pmatrix} R_m(k) \\ R_m(k+1) \end{pmatrix} \\ P = \begin{pmatrix} P_0(k_0) & P_1(k_1) \\ P_0(k_0+1) & P_1(k_1+1) \end{pmatrix} \\ H = \begin{pmatrix} H_{m,0}(k) \\ \overline{H}_{m,1}(k) \end{pmatrix} \\ N = \begin{pmatrix} N_m(k) \\ N_m(k+1) \end{pmatrix} \end{cases} \quad (8)$$

[Math 9]

$$\overline{H}_{m,1}(k) = H_{m,1}(k) + H_{m,2}(k)\exp\left(-j2\pi k_1 \frac{\tau}{M_1}\right) \quad (9)$$

Since it is possible to estimate H by determining the filter on the MMSE basis using matrix P that is composed of reference signal sequences and multiplying the received signal R with the filter, similarly to the first embodiment, it is possible to directly estimate the 0-th user's channel information $H_{m,0}(k)$ that uses the channel estimation method of the present embodiment.

On the other hand, as to the channel information on existing users using the CS scheme, it is possible to estimate channel information $H_{m,1}(k)$ and $H_{m,2}(k)$ of individual transmit antennas by applying the CS method once again using $\overline{H}_{m,1}(k)$ estimated by the channel estimation method of the present embodiment and the received signals of the reference signals of the existing users that are not spatially multiplexed with the 0-th user.

On the other hand, when the phase rotation τ is rather large, it is impossible to neglect the phase difference given to the adjacent frequency components of the reference signal. In this case, it is possible to implement channel estimation by using three adjacent received frequency components. In this case, the received signal can be represented by the expression 2, where R, P, H and N are given as follows.

[Math 10]

$$\begin{cases} R = [R_m(k) \quad R_m(k+1) \quad R_m(k+2)]^T \\ P = \begin{pmatrix} P_0(k_0) & P_1(k_1) & P_1(k_1)\exp\left(-j2\pi k_1 \frac{\tau}{M_1}\right) \\ P_0(k_0+1) & P_1(k_1+1) & P_1(k_1+1)\exp\left(-j2\pi(k_1+1) \frac{\tau}{M_1}\right) \\ P_0(k_0+2) & P_1(k_1+2) & P_1(k_1+2)\exp\left(-j2\pi(k_1+2) \frac{\tau}{M_1}\right) \end{pmatrix} \\ H = [H_{m,0}(k) \quad H_{m,1}(k) \quad H_{m,2}(k)]^T \\ N = [N_m(k) \quad N_m(k+1) \quad N_m(k+2)]^T \end{cases} \quad (10)$$

Since it is possible to estimate H by determining the filter on the MMSE basis using matrix P that is composed of reference signal sequences and multiplying the received signal R with the filter similarly to the first embodiment, it is possible to directly estimate the 0-th user's channel information $H_{m,0}(k)$ that uses the channel estimation method of the present embodiment.

Further, as to the channel information on existing users using the CS scheme, similarly to the case where the phase rotation τ is small, it is possible to estimate channel information on the entire transmission band, by applying the CS scheme once again using $H_{m,1}(k)$, and $H_{m,2}(k)$, estimated by the channel estimation method of the present embodiment and the received signals of the reference signals that are not spatially multiplexed.

Description has been made on the channel estimation method when users using the CS schemes and a user using the channel estimation of the present embodiment coexist. The description herein was made by limiting the number of users and the number of transmit antennas of each user. However, it is possible to deal with a case where the number of user is greater than 2 and perform channel estimation.

Further, since it is possible to estimate channel information even when part of the signal spectrum of still another user is spatially multiplexed over two users of the same bandwidth, this means that it is possible to estimate channel information also when part of the signal spectrum of another user is spatially multiplexed with the signal spectrum of a user who performs single user MIMO transmission using multiple transmit antennas. Accordingly, this embodiment makes it possible to realize uplink MU-MIMO in which part of signal spectrum is spatially multiplexed even when the number of transmit antennas of each user is multiple.

Moreover, as already described in the first embodiment, when the transmission bandwidths and frequencies of individual users are made perfectly identical by frequency mapping, channel information may be estimated based on the CS scheme. Similarly to the first embodiment, it is also possible to appropriately change the phase rotation to be given to the reference signal in accordance with the channel estimation method applied to the 0-th user while the orthogonality between the first user and the second user is being maintained.

As described heretofore, according to the present embodiment, it is possible to perform estimation of channel information even when part of the signal spectrum of an addition new user is spatially multiplexed with the signal spectra of users between which orthogonality has been already established based on the CS scheme. For example, it becomes possible to apply such the MU-MIMO technique that superimposes part of a signal spectrum, even to a system such as LTE-A for which backward compatibility with LTE has to be maintained, this contributing to further improvement of frequency efficiency.

Other Examples

As the embodiments of this invention have been described in detail with reference to the drawings, the specific configuration should not be limited to the embodiments. Designs and others that do not depart from the gist of this invention should also be included in the scope of claims.

Each of the programs to be operated in the transmitting apparatus and receiving apparatus in the embodiments is a program (program that makes a computer function) for controlling a CPU or the like so as to realize the functions in the present embodiments. The data to be handed in these apparatus is temporarily stored in RAM at the time of processing, then is stored into ROM, HDD and/or storage devices and is read out, modified and written in by the CPU, as necessary. The recording medium for storing program may be any of semiconductor mediums (e.g., ROM, non-volatile memory card, etc.), optical recording mediums (e.g., DVD, MO, MD, CD, BD and the like), magnetic recording mediums (e.g., magnetic tape, flexible disc, etc.), and the like. Further, the functions of the above-described embodiment scheme are not only realized by executing the loaded program, but the functions may also be realized in accordance with the instructions of the program by processing in cooperation with an operating system, another application program or the like.

To put the product on the market, the program may be stored on a removable storing medium, or may be transferred to a server computer connected to a network such as the Internet or the like. In this case, the storage device of the server computer is of course included in the present invention.

Further, the whole or part of each of the transmitting apparatus and receiving apparatus in the above-described embodiments may be typically realized by an LSI as an integrated circuit. Individual functional blocks of the transmitting apparatus and receiving apparatus may be given in the form of a separate processor, or the whole or part of the blocks may be integrated into a processor. The method of circuit integration may be realized in the form of a dedicated circuit or general purpose processor, not limited to LSI. It goes without saying that if a technology of circuit integration replacing LSI technologies appears with the progress of semiconductor technologies, the integrated circuit based on the technology can also be used.

DESCRIPTION OF REFERENCE NUMERALS 1 transmitting apparatus
102 channel coder
104 data modulator
106 DFT unit
108 reference signal multiplexer
110 frequency mapping unit
112 IFFT unit
114 CP inserting unit
116 radio transmitter
118 radio receiver
120 control information acquisitor
122 reference signal sequence generator
2 receiving apparatus
20 first unit
202 radio receiver
204 CP removing unit
206 FFT unit
208 reference signal separating unit
210 estimation method switching unit
212 channel estimator
214 radio transmitter
220 channel equalizer
222 frequency demapping unit
23 second unit
232 IDFT unit
234 data demodulator
236 channel decoder
240 control information generator

The invention claimed is:
1. A radio communication system comprising:
a plurality of transmitting apparatuses; and
a receiving apparatus that include a plurality of receive antennas, wherein
the plurality of transmitting apparatuses includes:
a reference signal generator configured to generate a reference signal that is obtained by adding a time shift unique to each of the plurality of transmitting apparatuses to a known signal between each of the plurality of transmitting apparatuses and the receiving apparatus;
a reference signal multiplexer configured to multiplex data signal with the reference signal; and
a transmitter configured to transmit a signal multiplexed by the reference signal multiplexer, and
the receiving apparatus includes:
a receiver configured to receive signals transmitted from the plural transmitting apparatuses;
a reference signal separator configured to separate reference signals multiplexed on the signals received by the receiver;
a channel estimator configured to be able to estimate channel information based on a plurality of different channel estimation methods for estimating the channel information;
an estimation method switching unit configured to perform control of switching the channel estimation method of the channel estimator, in accordance with usage state of frequencies used by each of the plurality of transmitting apparatuses to transmit signals; and a decoder configured to decode the data signal, based on the channel information estimated by the channel estimator.

2. The radio communication system according to claim 1, wherein
the estimation method switching unit is configured to vary the amount of time shift to be given to the known signal in each of the plurality of transmitting apparatuses, in accordance with the selected channel estimation method by the estimation method switching unit.

3. The radio communication system according to claim 2, wherein
the plurality of transmitting apparatuses includes a first transmitting apparatus and a second transmitting apparatus, and
the estimation method switching unit is configured to perform control of switching estimation methods for estimating each of channel information for the first transmitting apparatus and the second transmitting apparatus, between when the frequencies the first transmitting apparatus is using and the frequencies the second transmitting apparatus is using are all in common and when the frequencies the first transmitting apparatus is using and the frequencies the second transmitting apparatus are only partly in common.

4. The radio communication system according to claim 3, wherein
the estimation method for estimating the channel information uses a cyclic shift scheme when the frequencies the first transmitting apparatus is using and the frequencies the second transmitting apparatus are only partly in common, and uses a spatial filtering scheme when the frequencies are only partly in common.

5. A receiving apparatus in a radio communication system, the radio communication system including a plurality of transmitting apparatuses and a receiving apparatus that includes a plurality of receive antennas, the receiving apparatus comprising:
a receiver configured to receive a signal that is formed by multiplexing a data signal with a reference signal that is obtained by adding a time shift unique to each of the plurality of transmitting apparatuses to a known signal between each of the plurality of transmitting apparatuses and the receiving apparatus;
a reference signal separator configured to separate the reference signal multiplexed on the signal received by the receiver;
a channel estimator configured to be able to estimate channel information based on a plurality of different channel estimation methods for estimating the channel information;
an estimation method switching unit configured to perform control of switching the channel estimation method of the channel estimator, in accordance with usage state of frequencies used by each of the plurality of transmitting apparatuses to transmit signals; and
a decoder configured to decode the data signal, based on the channel information estimated by the channel estimator.

* * * * *